United States Patent [19]
Howe

[11] 4,172,606
[45] Oct. 30, 1979

[54] FLUID CONDUIT CONNECTOR

[76] Inventor: Wilson S. Howe, 1935 Spruce Ave., Longmont, Colo. 80501

[21] Appl. No.: 838,820

[22] Filed: Oct. 3, 1977

[51] Int. Cl.² .................... F16B 37/10; F16L 37/00
[52] U.S. Cl. .................... 285/34; 85/32 V; 85/33; 151/19 R; 285/175; 285/323; 403/342
[58] Field of Search ............... 85/32 V, 33; 151/19 R; 279/28, 42, 1 SG, 51; 285/34, 323, 322, 343, 332.3, 175; 403/342

[56] References Cited

U.S. PATENT DOCUMENTS

| | | | |
|---|---|---|---|
| 520,952 | 6/1894 | Cox | 285/34 |
| 1,475,907 | 11/1923 | Volman | 85/33 |
| 1,816,058 | 7/1931 | Slovinski | 285/34 |
| 2,397,025 | 3/1946 | MacBlane | 279/28 X |
| 2,814,324 | 11/1957 | Shur | 85/33 X |
| 3,151,652 | 10/1964 | Zahodiakin | 151/19 R |
| 3,151,653 | 10/1964 | Zahodiakin | 151/19 R |
| 3,695,139 | 10/1972 | Howe | 85/33 |
| 3,797,336 | 3/1974 | Howe | 85/33 X |
| 4,071,158 | 1/1978 | Maheu | 85/33 X |

FOREIGN PATENT DOCUMENTS

| | | | |
|---|---|---|---|
| 433001 | 8/1911 | France | 285/34 |
| 622595 | 6/1927 | France | 285/34 |
| 143790 | 4/1931 | Switzerland | 151/19 R |
| 228390 | 6/1969 | U.S.S.R. | 85/33 |

*Primary Examiner*—Mervin Stein
*Assistant Examiner*—Carl F. Pietruszka
*Attorney, Agent, or Firm*—Horace B. Van Valkenburgh; Frank C. Lowe

[57] ABSTRACT

Plastic pad at center of concave bevel of each semicircular segment maintains lateral and axial alignment when segments spread apart by pipe. In another special configuration, inside and outside segments are offset semicircles, with a greater dimension across opposed edges when abutting than middle. Inside threads of segments relieved at edges, with full threads at center and progressive decrease to each edge. Segments have cone portions opposite bevel, for engagement with concave seat of housing to tighten threads. Ring rotatable relative to housing but axially fixed has convex cone spaced from seat and engaged by bevel of segments for spreading. Resilient ring in peripheral groove of segments. Outside notches at segment edges receive housing pin or ring, to prevent relative rotation and restrain lateral play at abutting edges. Numerous variations of construction disclosed.

20 Claims, 31 Drawing Figures

FLUID CONDUIT CONNECTOR

This invention relates to connectors for forming threaded connections in fluid flow lines, and more particularly to such connectors which can be connected rapidly. The connectors of this invention are particularly useful in connecting fire hoses, as to fire hydrants, nozzles and the like, and also useful in connecting industrial equipment, such as spray nozzles to pipes, as well as other types of installations in which a rapid connection is to be made in a fluid flow line.

BACKGROUND OF THE INVENTION

The quick connect coupler of my U.S. Pat. No. 3,695,139 was developed for connecting threaded bolts to various types of devices, as in attaching plates, forms, rails or the like to concrete or other types of walls. These quick connect couplers included a plurality of segments threaded on the inside, for engagement with bolt threads and forming essentially a circle around the bolt, with resilient rings for holding the segments together in annular relationship. The segments, when so assembled, provided a convex frusto-conical surface or cone at one end and a concave frusto-conical surface or bevel at the opposite end. A conical bevel seat, in position to engage the cone end of the segment assembly, moved the segments into closer engagement with the bolts until the inside threads of the segments became tight on the bolt threads. For quick connection, a nut assembly, which included the segments, was provided with a conical spreading surface in juxtaposition to the concave surfaces of the segments, so that when the nut was pressed onto the bolt, the segments could be pushed against the cone and spread apart against the force of the resilient rings, until the end of the nut bearing the concave seat abutted against the article from or through which the bolt extended. Then, the segments would move inwardly for engagement of the inside threads of the segments with the bolt threads. Then, a few turns of the nut would tighten the threads together.

The present invention utilizes certain principles of my prior patent. However, when the precise constructions disclosed therein were attempted to be applied to a quick or rapid connector for fluid conduits, a number of problems were encountered. One problem was caused by the limitations on the total diameter of the connector and also the number of threads which could be provided on the connector. As the diameter of a conduit increases, the tendency for cross threading of the segment threads with the conduit threads increases, since a slight angular tipping of a segment, unobjectionable with a small bolt, magnifies the difficulty many times, when the segments are considerably larger in diameter and extend around a larger diameter conduit. Similarly, the use of more than two segments increased the problems of cross threading, although my additional prior U.S. Pat. No. 3,797,336 for "Quick Connector Nut" does disclose a pair of essentially semicircular segments in a nut adapted to be pushed onto a bolt and then tightened by turning a few turns. Also, the larger diameter and the necessity for limiting the amount of travel prior to tightening required a limited number of threads which again increased the possibility of cross threading. In addition, it was found that the segments of larger diameter tended to hang up, as it were, on a threaded conduit to which it was being connected and thus failed to rotate with the housing or the like in which mounted.

The problems in thread alignment and quick snapping of the segment threads onto the threads of a conduit were increased by the relatively lesser force exerted by the normal size of wire used in forming the spring rings for holding the segments together. In addition, axial misalignment of the segments proved to be a problem, again contributing to cross threading, in addition to tipping of the segments. Another problem produced by fluid conduits, not present in ordinary bolt connections, is that of sealing the conduit against leakage. This is ordinarily produced by providing a seal ring, preferably on the connector, and against which is abutted a pipe or the like on which the connector is to be installed. The presence of the seal ring means that the relative movement between the pipe or the like and the connector is limited, since for conservation of space, internally threaded segments must be disposed as closely as possible to the seal ring.

The principal prior type of quick connectors for fluid conduits comprised toggle clamps for holding a conduit against a pipe, but unless the toggles are completely seated, the entire connector may pop off the pipe. Also, in the case of fire plugs, vandals may batter the pipe threads, making it difficult to screw a fire hose coupling onto the threads.

Among the objects of this invention are to provide a connector for fluid conduits having threaded segments, which will readily and quickly engage the threads of conduit; to provide such a connector in which tipping or axial misalignment of the segments is substantially avoided, thereby reducing to a minimum the possibility of cross threading; to provide such a connector in which the force produced by resilient means for holding the segments together does not require an increase in proportion to the diameter of the conduit; to provide such a connector in which the segments are positively connected when relative rotation of an enclosure for the segments is produced to cause the threads to tighten; to provide such a connector which is particularly useful with a conduit in which a seal ring is abutted by a pipe or the like to which the connector is being attached and the problems resulting from limitation on relative movement of the pipe or the like into engagement with the seal ring are overcome; to provide such a connector which reduces lateral play of the edges of the segments; to provide such a connector which may be readily installed on a pipe or the like with damaged threads; to provide such a connector which will not pop off, even though not completely tightened; and to provide such a connector which is efficient, effective and reliable in use, as well as relatively long wearing.

SUMMARY OF THE INVENTION

The invention inclues a housing having a concave, frusto-conical or bevel seat within which is disposed a cone ring having, at its inner end, a covex frusto-conical surface or cone which is spaced from the bevel a distance sufficient to accommodate a pair of generally semicircular segments having on one end a cone portion to engage the seat, for tightening the interior threads of the segments on a pipe or the like to which the connector is to be attached, and on the opposite end, a bevel movable into engagement with the cone of the cone ring, in order to spread the segments apart and permit the threads of the pipe or the like to be inserted quickly within the segment. The segments are held together by a resilient compression ring surrounding them, while the cone ring is further provided with a seal against which the end of the pipe or the like abuts, so that the distance between the cone of the cone ring and the inside bevel of the housing is such that the segments are required to move a relatively short distance only, between abutment on one side against the cone of the cone ring, when the pipe moves within the segments or the segments move over the pipe, and the approach toward or abutment of the cone portions of the segments against the bevel of the housing, when the connection is tight. The number of threads on the inside of the segments is necessarily limited, with the segments being turned, as by the housing, after the pipe or the like abuts the seal, for only one or two turns, in order to make the connection tight. In accordance with this invention, the segments have a configuration which provides means for preventing tipping of the segments relative to each other when the segments are moved toward the ring cone by the pipe or the like, since the edges of the segments tend to be pushed a greater distance along the ring cone than the middle of the segments. Such means may comprise a pad extending from the bevel of each segment at the middle thereof, to cause the middle of each segment to move outwardly along the cone and axially toward the larger end of the cone a distance the same as the axial movement of the edges of the segments to maintain the segments in lateral alignment, perpendicular to the axis of the conduit. An alternative configuration is to provide an offset semicircular shape of the segments, when the opposed edges are in abutting relation, with a larger dimension across the abutting segment edges and a smaller dimension across the centers of the segments. In addition, further in order to permit the threads of the pipe or the like to move more readily within the edges of the segments, a relief of the threads is produced on the interior of each segment by leaving a full thread at the middle of each segment and a considerably reduced thread at each edge of each segment, with the thread depth progressively decreasing from the middle toward each edge. Means are also provided to positively rotate the segments upon rotation of the housihg, or cause the segments to remain stationary, in the event the housing remains stationary, while a pipe or the like is turned. Such means may comprise pins or ribs extending into opposed slots in the essentially abutting edges of the segments, or opposed flats in the housing and corresponding flats at each end of each segment.

THE DRAWINGS

Additional objects and the novel features of this invention will become apparent from the description which follows, taken in conjunction with the accompanying drawings, in which.

Figure 15:
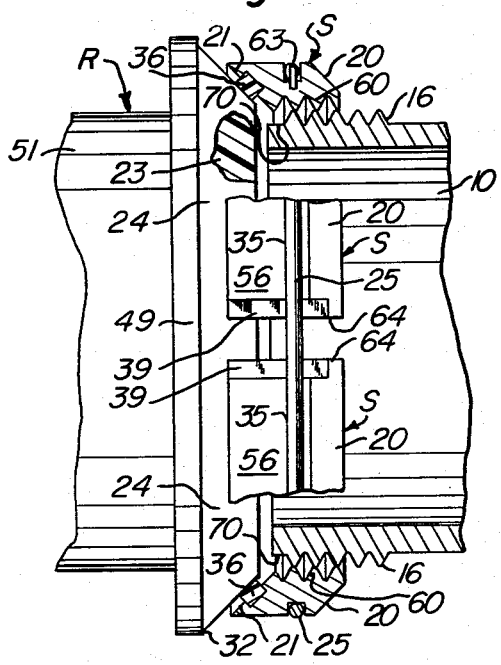

FIG. 15 is a side elevation of the cone ring, segments and connecting pipe, with certain fragmentary portions and cross sections being used to illustrate the action of a threaded pipe or the like in spreading the segments apart for subsequent engagement of the threads, and more particularly the action at the middles of the segments as the segments are pushed toward or against a cone of the cone ring.

Figure 16:
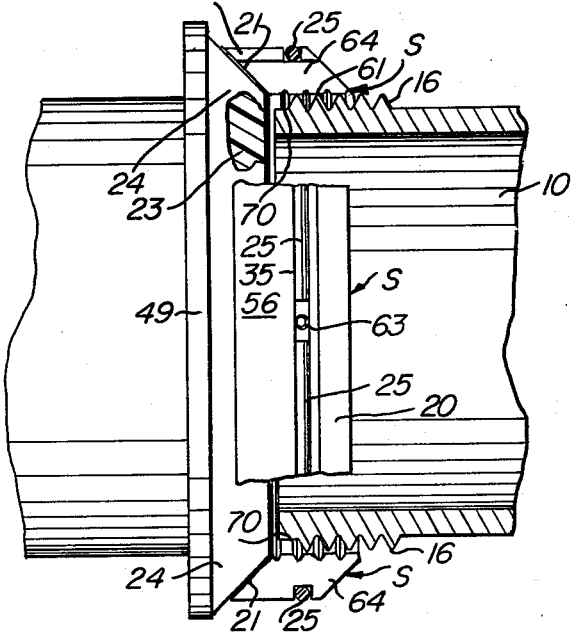

FIG. 16 is a top plan view of the parts of FIG. 15, shown in essentially the same manner, but showing more particularly the action at the edges of the segments.

Figure 17:
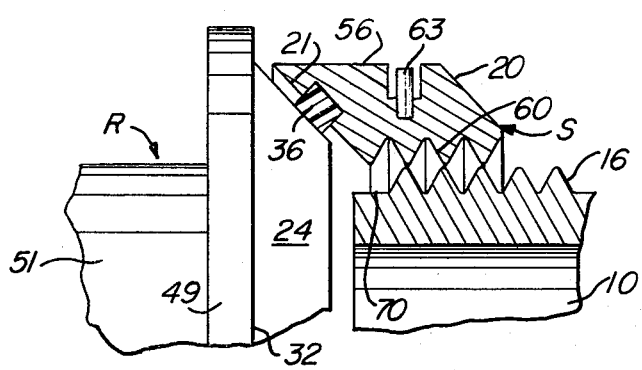

FIG. 17 is an enlargement of a fragmentary upper portion of FIG. 15.

Figure 18:
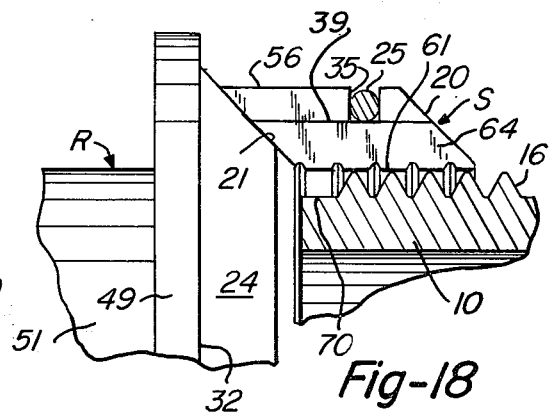

FIG. 18 is a similar enlargement of a fragmentary upper portion of FIG. 16.

Figure 19:
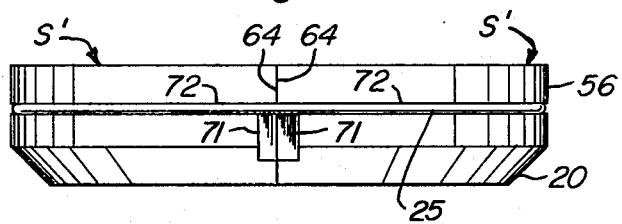

FIG. 19 is a side elevation of a pair of segments comprising an alternative construction of the segments.

Figure 20:
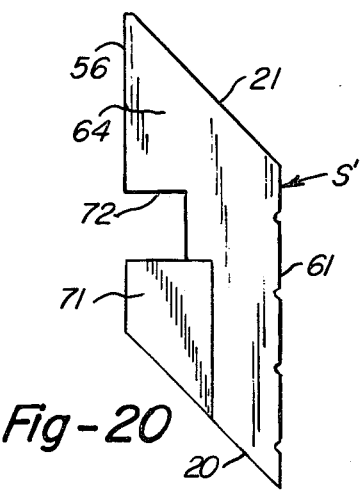

FIG. 20 is an enlarged view of one end of one of the segments of FIG. 19.

Figure 21:
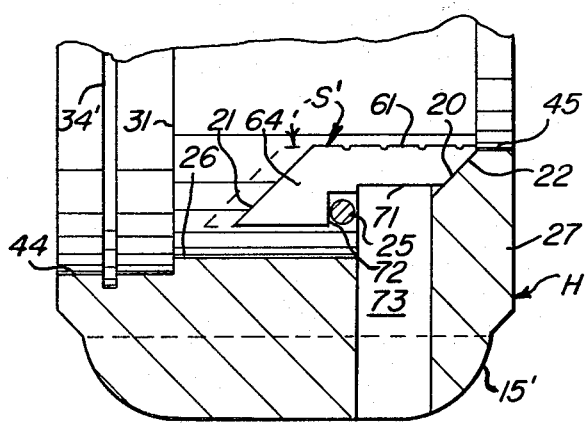

FIG. 21 is a fragmentary cross section, on an enlarged scale, showing an alternative housing with which the segment assembly of FIG. 19 may be utilized.

Figure 22:
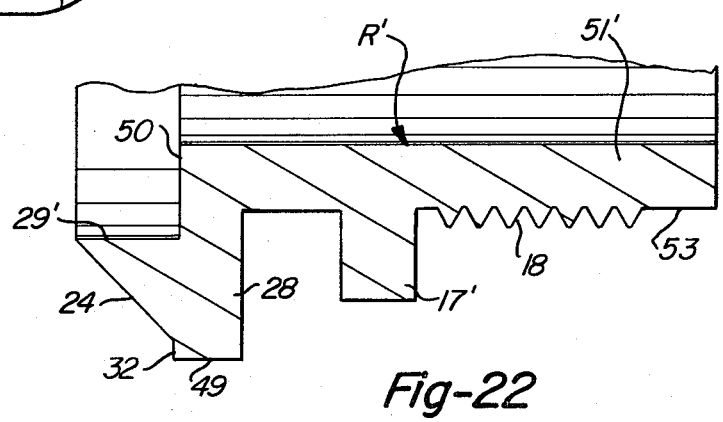

FIG. 22 is a fragmentary cross section, on an enlarged scale, showing an alternative cone ring which may be cast and showing particularly a case spanner lug.

Figure 23:
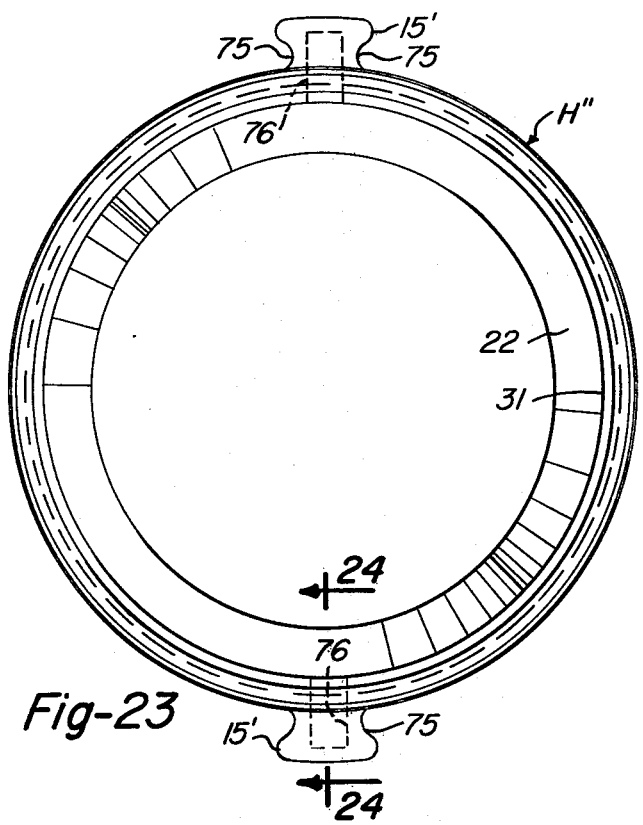

FIG. 23 is an end view of an alternative housing, also adapted to be cast.

Figure 24:
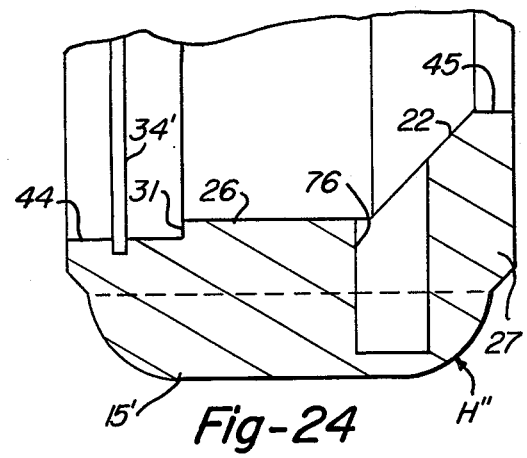

FIG. 24 is a fragmentary cross section, on an enlarged scale, taken along line 24—24 of FIG. 23.

Figure 25:
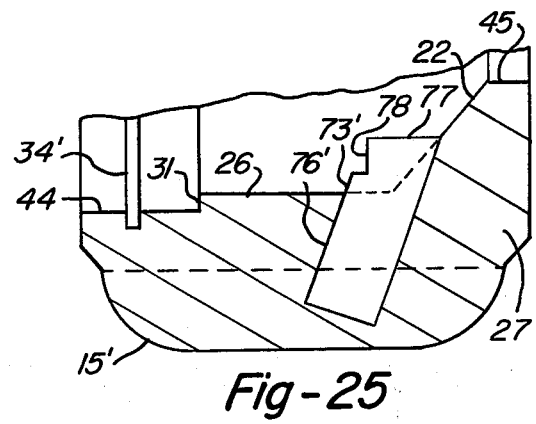

FIG. 25 is a fragmentary cross section similar to FIG. 24, but showing an alternative construction and a special pin usable therewith.

Figure 26:
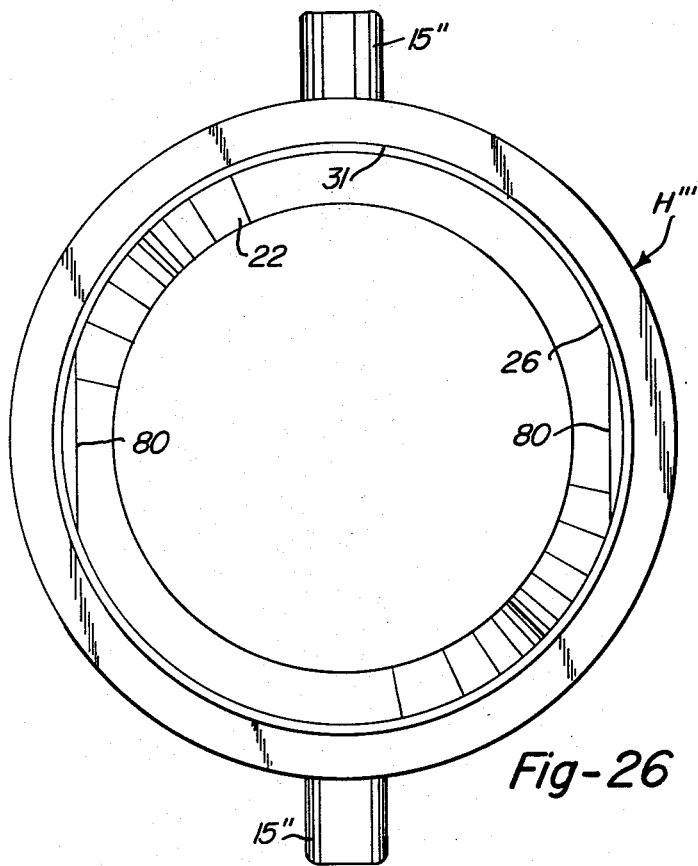

FIG. 26 is an end view of an additional alternative housing adapted to be cast, showing particularly flat surfaces for restraining rotation of the segment assembly relative to the housing.

Figure 8:
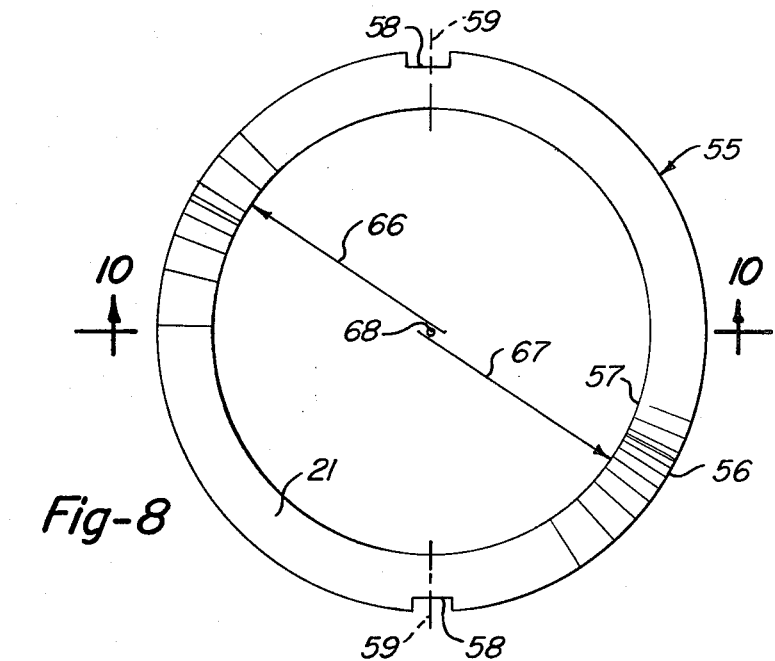
FIG. 8 is a plan view of a ring used in making a pair of opposed, generally semicircular segments.
Figure 27:
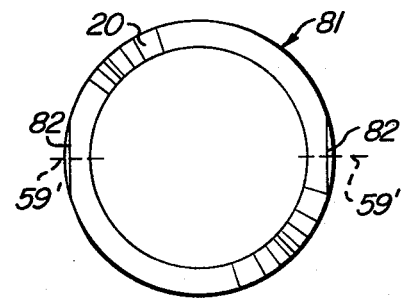

FIG. 27 is an end view similar to FIG. 8, but on a reduced scale and showing a ring used for the production of flat surface at each edge of each segment for use with the housing of FIG. 26.

Figure 28:
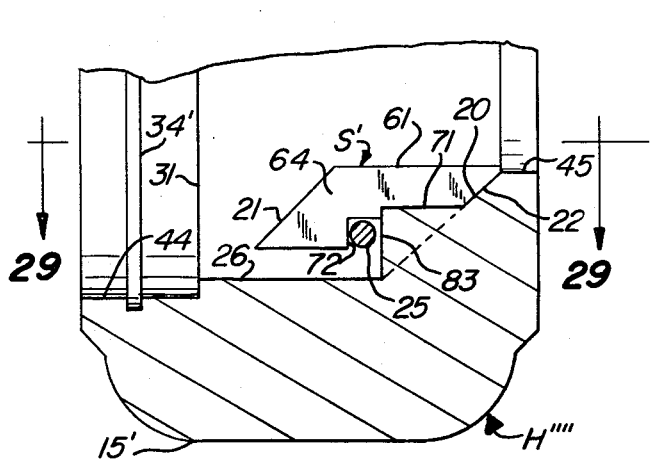

FIG. 28 is a cross section similar to FIG. 21, but showing an alternative construction of the housing in which ribs, rather than pins, may be utilized to prevent rotation of the segment assembly relative to the housing.

Figure 29:
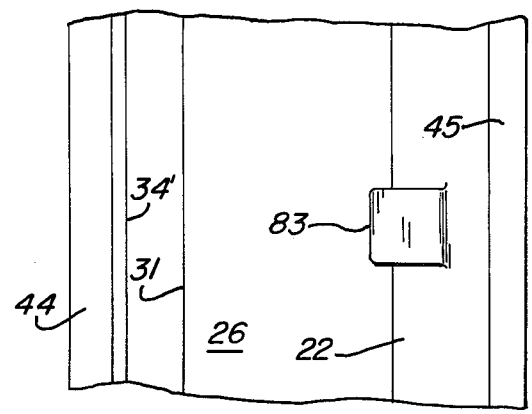

FIG. 29 is a fragmentary inside view of the alternative housing of FIG. 28, looking toward the rib shown therein.

Figure 30:
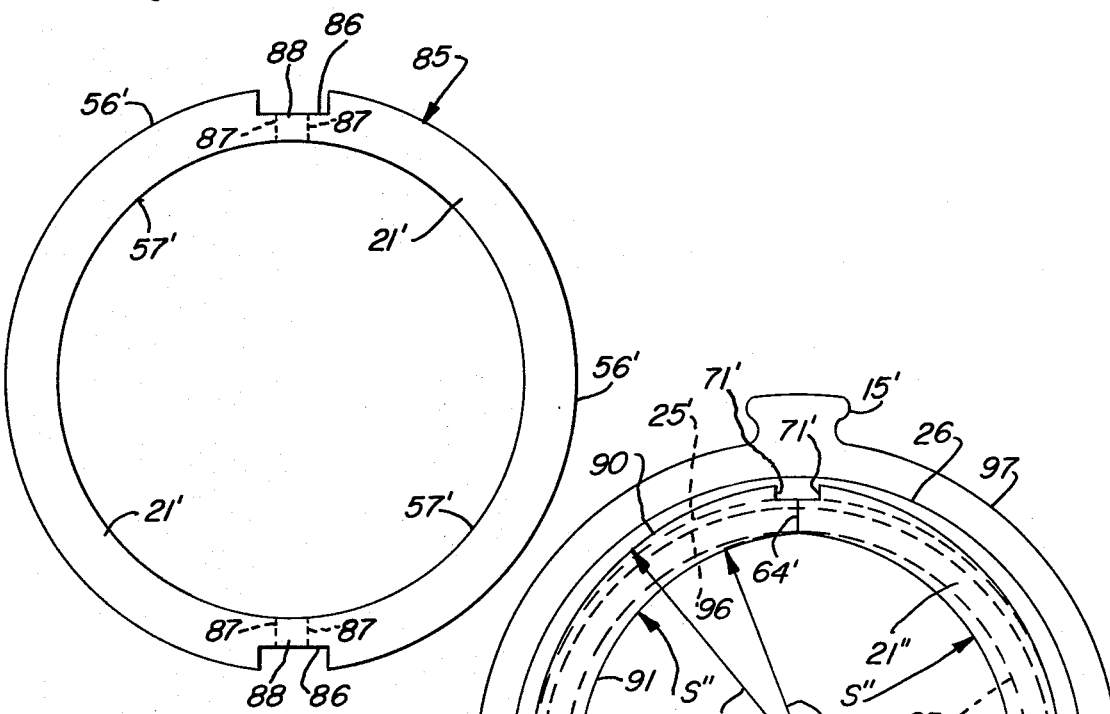

FIG. 30 is a plan view of a ring used in forming opposed, generally semicircular segments in a manner alternative to that of FIG. 8.

Figure 31:
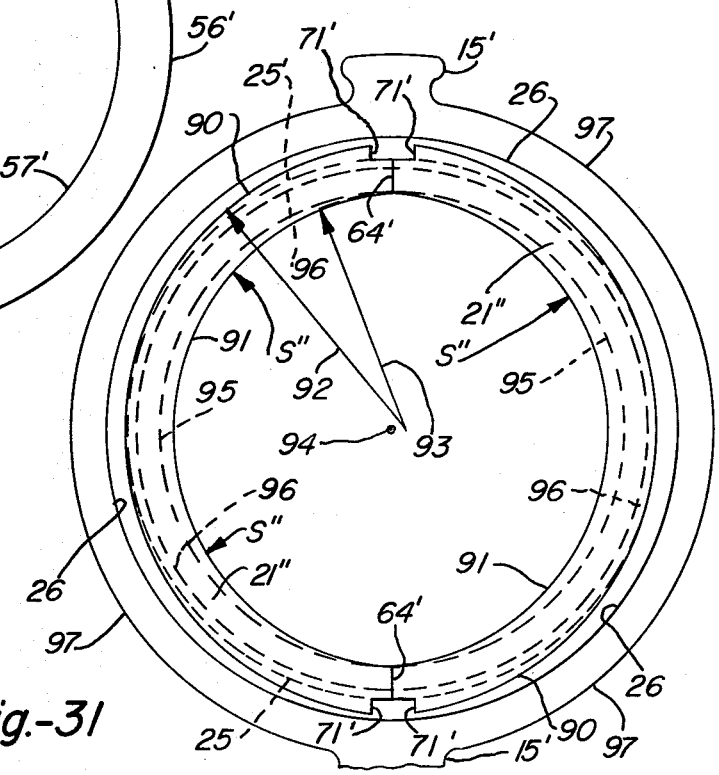

FIG. 31 is a plan view of abutting segments formed from a ring in a further alternative manner, with a housing rim being shown to illustrate the association of the segments therewith.

DESCRIPTION OF THE PREFERRED EMBODIMENT

Figure 1:
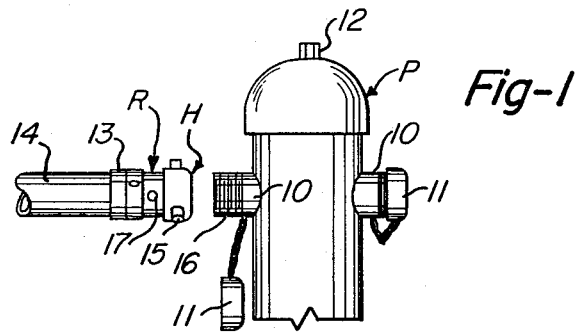
FIG. 1 is a side elevation of a fire hydrant or plug and hose provided with a connector of this invention in position to be attached thereto.

As illustrated in FIG. 1, a connector of this invention, which includes a housing H and a cone ring R, may be utilized to connect a fire hose to each of one or more pipes or plugs 10 of a fire hydrant or plug P, each pipe 10 having a removable cap 11 chained to the fire plug or prevent loss, as shown. A valve rod 12 extends through the top of the fire plug and may have a conventional hex head for engagement by a wrench to open and close the valve, as to turn the released water into the pipes 10, while a cap 11 remains on each pipe to which a hose is not connected, to prevent outflow of water therefrom. Cone ring R is attached to a conventional coupling 13 of a fire hose 14, while housing H is provided with spanner lugs 15 for turning the connector onto threads 16 of the corresponding pipe 10. Spanner lugs 17 on the ring are utilized in connecting the ring to the fire hose coupling 13, as by exterior threads 18 of FIG. 2, at the rear of ring R, engaging opposed threads on the inside of a flange 19 of coupling 13.

The connector is tightened on the pipe 10 by a pair of segments S which have, as in FIGS. 2 and 3, a convex, frusto-conical surface 20, for convenience hereinafter referred to as cone portion 20, on one end and, on the opposite end, a concave, frusto-conical surface 21, for convenience hereinafter referred to as bevel 21. The segments are interiorly threaded and are tightened on threads 16 of the pipe 10, as by turning the segments along with the housing H, so that the cone portion 20 of both segments wedge against a concave bevel seat 22 at the front of housing H. The segments S each extend for approximately 180° around the inner circumference of the housing H and are forced to rotate with the housing, in a manner described below. Ar, the segments may be maintained stationary with the housing, as when an industrial nozzle is to be attached to a connector of this invention and the housing H is maintained stationary while the nozzle is turned into the connector. As the segments are wedged inwardly by the bevel seat 22 of the housing H and threaded onto the threads of pipe 10, as in FIG. 2, the end of pipe 10 will compress a seal ring 23 formed of suitable resilient material and carried by the ring R, which remains stationary, when the housing and segments rotate. The ring R is also provided with a cone 24 which cooperates with the concave bevel 21 at the adjacent end of each segment S, to cause the segments to spread apart when the connector is thrust onto the pipe 10 or the like, or when the pipe 10 or the like is thrust into the connector. Cone portions 20 and cone 24, bevel 21 and seat 22 conveniently are disposed at an angle of 45° to the centerline of the respective part. The lateral spreading of the segments S permits the segments to move over the threads 16, as in the manner described later, so that only a few turns of the housing H are necessary, in order to tighten the segments onto the threads of the pipe or the like as soon as the end of pipe 10 abuts seal ring 23. Thus, the connector of this invention permits a quick attachment without the necessity of fully threading the connector onto a pipe or the like. For disconnection, the segments need to be completely threaded off the pipe, since they are resiliently held together by a spring ring 25. The number of threads engaged may be reduced in number from that of the ordinary nut and bolt to achieve the quick connection and also a faster disconnection.

Housing H is provided with an interior, cylindrical wall 26 which bounds, on the outside, a cylindrical space in which segments S are received and for movement between cone 24 of ring R and bevel seat 22 of housing H and vice versa. Bevel seat 20 is formed inside an inwardly extending flange 27 of housing H, while cone 24 is formed on the outside of a laterally extending flange 28 of ring R. Inwardly of flange 28, a recess 29 is formed to receive the sealing ring 23 and may be provided with an undercut 30 to accommodate a sealing ring of the configuration shown, which is adapted to be locked within the recess. However, when the friction between the ring and the wall of recess 29 is sufficient, the sealing ring may be cylindrical in shape and the undercut eliminated. The housing H has a shoulder 31, as in FIG. 3, for abutment by a lip 32 of FIGS. 6 and 7, which extends outwardly from the cone 24, to restrain the ring against movement toward the segments. The housing and ring are locked in position by a narrow split ring 33 formed of resilient material, such as spring steel, and received in a slot 34 formed in the housing adjacent the rear edge thereof.

The segments S, as indicated previously, are held together and urged toward each other by a spring ring 25. This ring is formed of resilient material, such as spring steel, and occupies a groove 35 extending circumferentially around the outside of each segment in a corresponding position. For spreading the centers of the segments apart, in a manner described in greater detail later, to maintain lateral and axial alignment of the segments when the connector is thrust onto the pipe 10, or similar engagement with a part to be connected, the middle of each segment is provided with a pad 36 of FIG. 3, such as cylindrical and formed of plastic. Pad 36 engages the cone 24, when the segments are pushed or moved toward the cone through engagement of the segments with the threads 16 of the pipe 10.

Each of the spanner lugs 15 of the housing H is provided with a threaded stem 37, while the stem of one of the lugs is provided with a smooth stem extension or pin 38 which engages a slot 39 in the adjacent ends of both segments S. When there are three spanner lugs 15, as shown in FIG. 1, the segment slots 39 at the opposite ends of the segments are engaged by a corresponding smooth pin 40 of a screw 41. However, when there are only two spanner lugs 15, each may be provided with a stem extension 38. Similarly, the spanner lugs 17 may be provided with a threaded stem 42 for attachment to ring R, which may be provided with two or three lugs, as desired. Pin 38 and pin 40, or two pins 38 when two lugs 15 are used, extend radially into slots 39 a sufficient distance, i.e. with a small clearance, so that the ends of the pins will prevent lateral play of the ends of the segments S, to avoid one source of cross threading.

Figure 2:
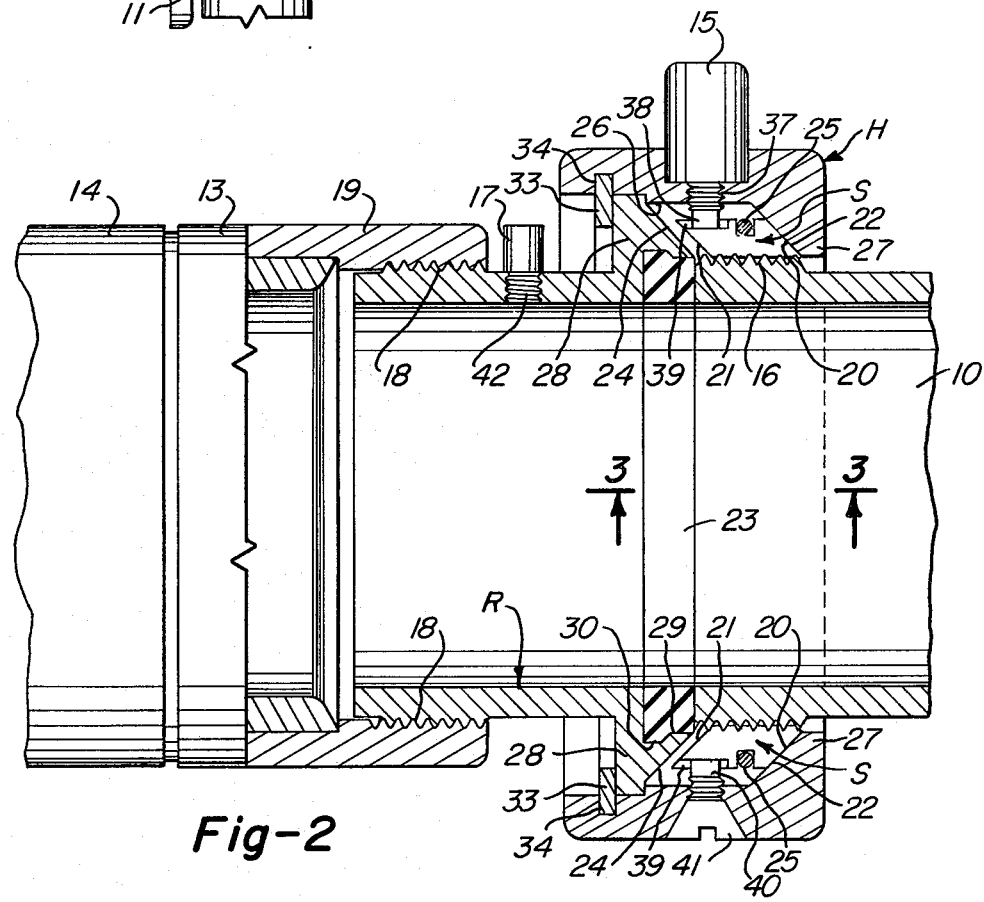
FIG. 2 is a vertical longitudinal section, on an enlarged scale, of the connector and hose of FIG. 1 attached to a pipe of the fire hydrant.
Figure 3:
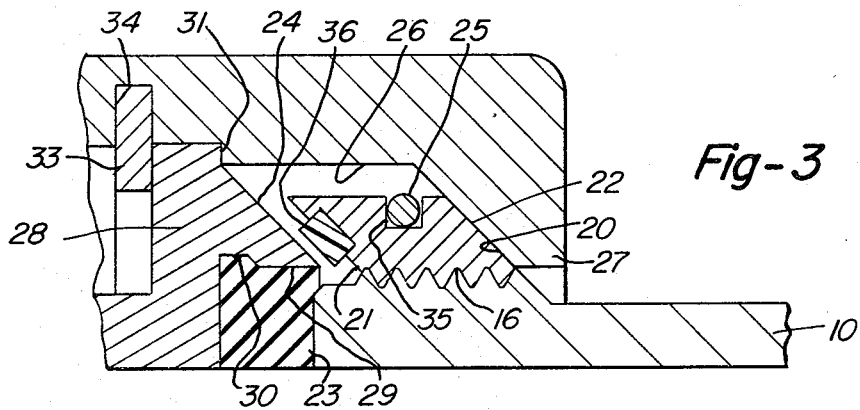
FIG. 3 is a fragmentary horizontal section, on a further enlarged scale and taken along line 3—3 of FIG. 2.
Figure 4:
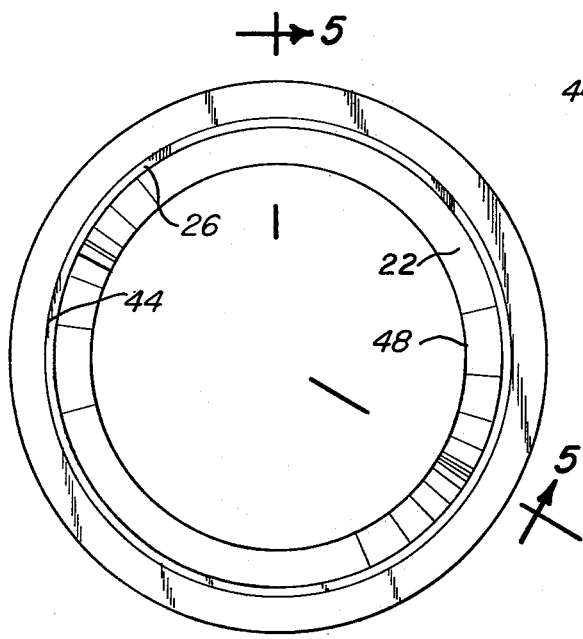
FIG. 4 is an end view, on a slightly reduced scale, of a housing forming part of the connector of FIG. 2.
Figure 5:
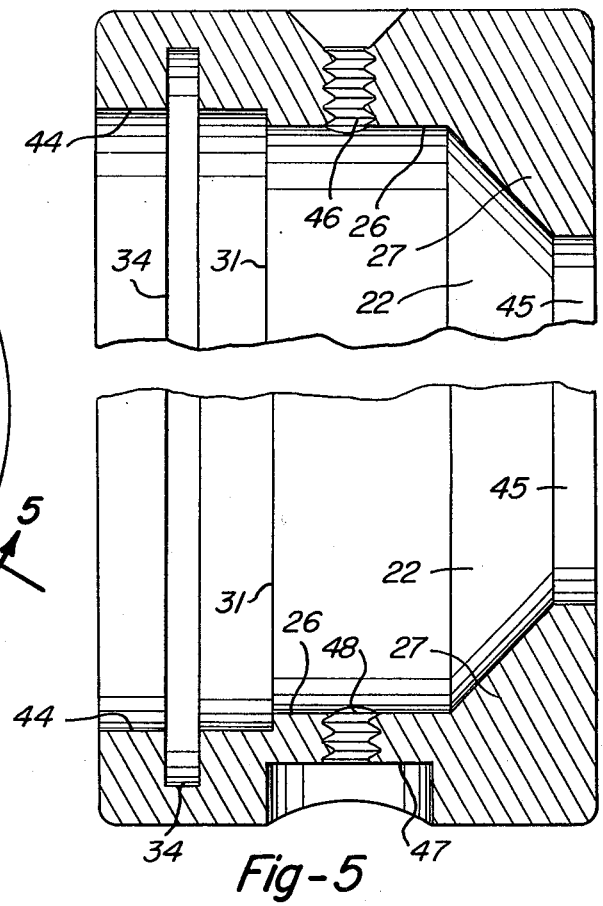
FIG. 5 is a condensed longitudinal section, on an enlarged scale, taken along offset line 5—5 of FIG. 4.

The housing H, as in FIGS. 4 and 5, may be formed from a casting or forging, or round stock, and machined to produce the inner surfaces, including the bevel seal 22, inside wall 26 and shoulder 31, as well as an inner cylindrical surface 44 in which the slots 34 for the retaining ring 33 of FIG. 2 is produced, although certain die casting techiques may permit a part or, in some instances, all of the machining to be avoided. Also, an inner rim 45 of flange 27 may be produced, dimensioned to clear threads 16 of pipe 110 with a suitable tolerance. A hole 46, tapped and countersunk, may be produced in one side of the housing for screw 41 of FIG. 2, while a socket 47 and tapped hole 48 may may be produced for each of the spanner lugs 15. When there are only two spanner lugs, a socket 47 and tapped hole 48 may be produced at opposite sides of the housing and screw hole 46 eliminated.

Figure 6:
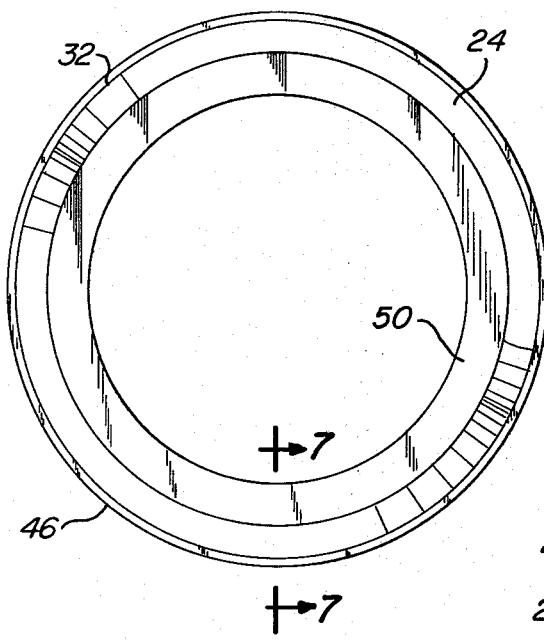
FIG. 6 is an end view, on a slightly reduced scale, of a cone ring of the connector of FIG. 2.
Figure 7:
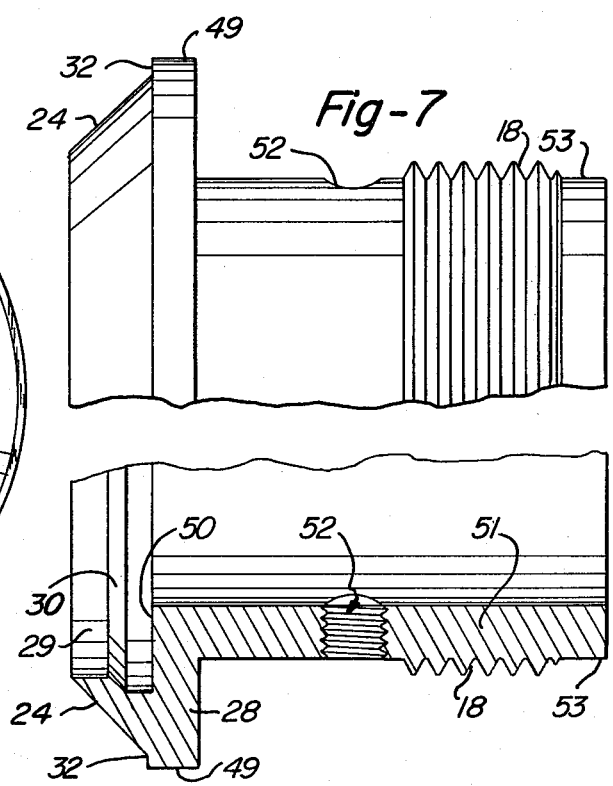
FIG. 7 is a condensed side elevation, on an enlarged scale, of the cone ring, including a partial section taken along line 7—7 of FIG. 6.

The cone ring R, as in FIGS. 6 and 7, may be produced from a suitable casting or forging, or round stock, in order to produce the threads 18, cone 24, recess 29 and undercut 30, as well as a lip 32 outwardly of cone 24. An outer cylindrical rim 49 of flange 28 is also produced to dimension within tolerances, to fit within the cylindrical surface 44 of housing H, as well as a shoulder 50 against which the sealing ring 23 of FIG. 2 abuts and which forms the bottom of recess 29. The inner passage within a cylindrical flange 51 of the ring may remain in the ascast condition or machined, depending upon the source of material, while a tapped hole 52 may be provided at opposed positions of flange 48 for the lugs 17. Also, the threads 18 may be produced on the exterior of flange 51, with a narrow cylindrical surface 53 rearwardly of threads 18, to fit within the flange 19 of hose coupling 15, as in FIG. 2.

Figure 9:
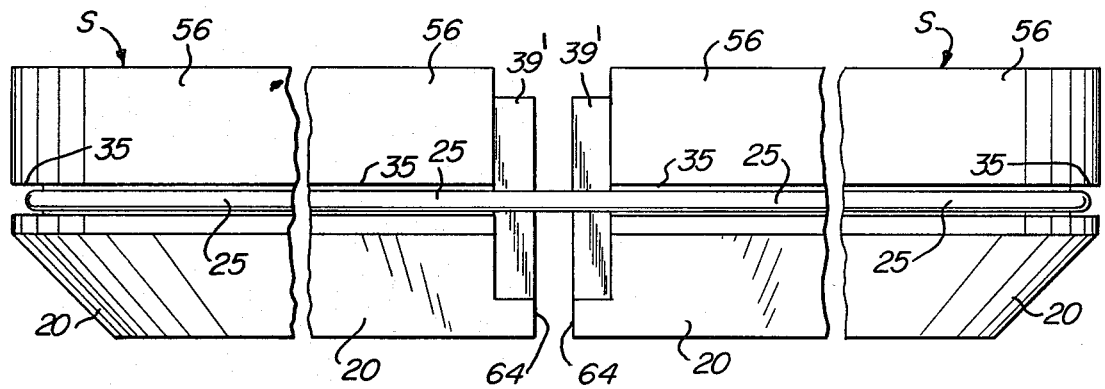
FIG. 9 is a condensed side view, on an enlarged scale, of a segment assembly which includes opposed segments formed from the ring of FIG. 8 and split circular spring ring, with the segments slightly spread apart.
Figure 10:
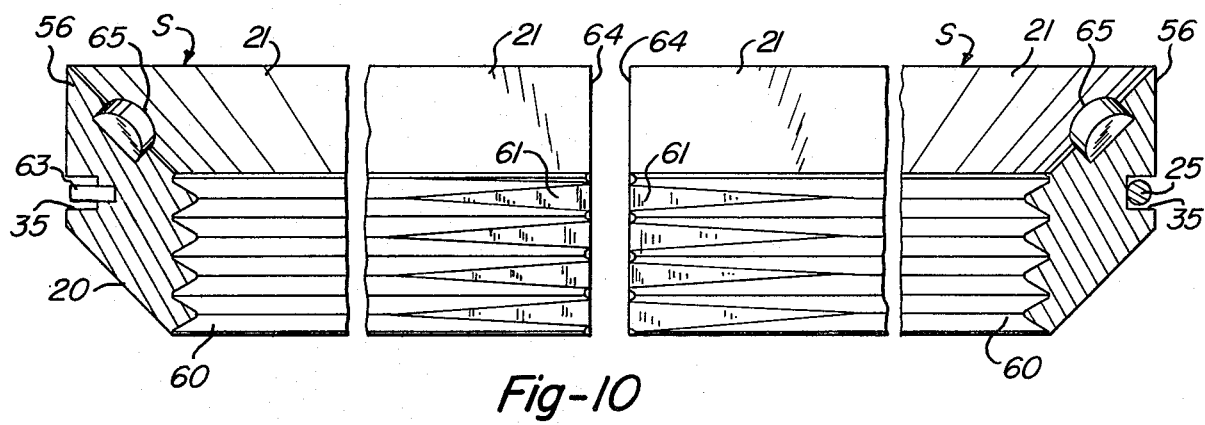
FIG. 10 is a condensed cross section, on an enlarged scale, of the assembly of FIG. 6 but taken at the position of line 10—10 of FIG. 8.
Figure 11:
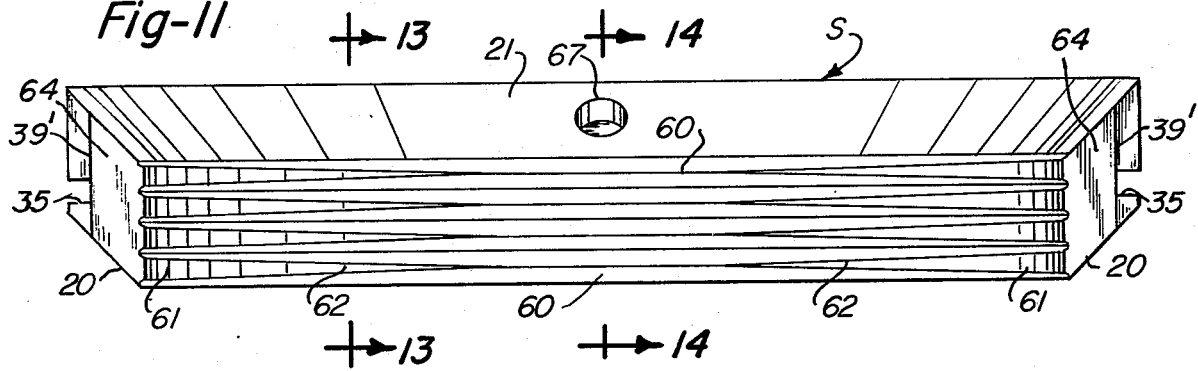
FIG. 11 is an inside elevation, on a smaller scale, of one of the segments of FIG. 9.
Figure 12:
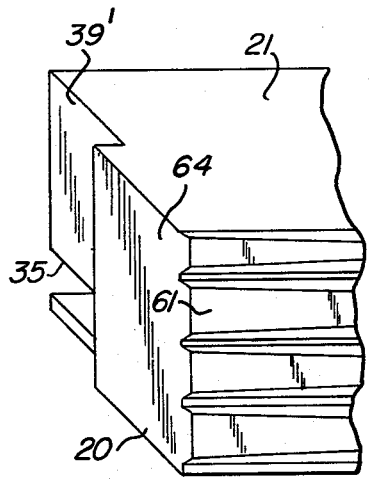
FIG. 12 is a fragmentary perspective view, on a further enlarged scale, of the left end of the segment of FIG. 11 and an adjoining portion, showing particularly a reduction in the threads.
Figure 13:
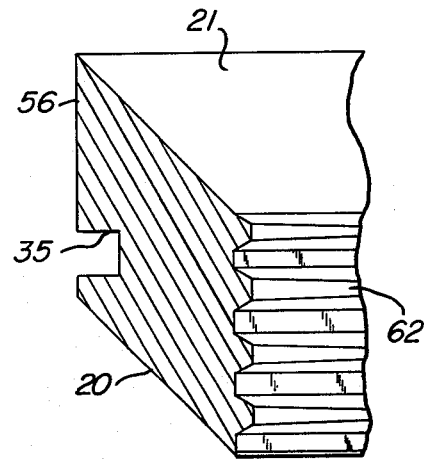
FIG. 13 is a fragmentary perspective view of a section taken along line 13—13 of FIG. 11 and an adjoining portion, on a further enlarged scale, showing particularly a lesser reduction in the threads.
Figure 14:
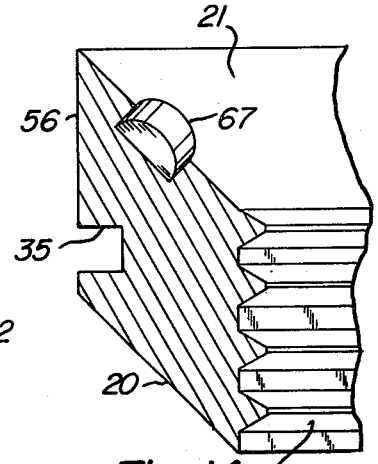
FIG. 14 is a fragmentary perspective view of a section taken along line 14—14 of FIG. 11, and an adjoining portion, on a further enlarged scale, and showing particularly full threads.

As illustrated in FIG. 8, for production of the segments S, a ring 55 may be provided with an outer wall 56, an inner wall 57, a notch 58 on opposite sides, with a cone portion (not shown in FIG. 8 but shown on the segments in FIGS. 9 and 10 at one end and a bevel 21 on the opposite end. The segments are adapted to be produced by severing the ring along lines 59 across the midpoints of notches 58, to produce the modified slots 39 which extend inwardly onto the bevel 21 and also onto the cone portion 20, again as in FIG. 9. Full threads may be tapped around the inside of the ring prior to cutting the ring apart along lines 59, to produce full threads 60, shown in FIGS. 10 and 11, not only at the middle of each segment thereby, but also around the entire inner periphery. After these full threads have been produced, they may be relieved, particularly at a position corresponding to the edges of the segments to produce, as in FIGS. 10 and 11, full threads 60 at the middle, also as in FIG. 14, greatly reduced threads 61 at each edge, also as in FIG. 12, and less reduced threads 62 between the middle and each edge, also as in FIG. 13. Thus, the threads are relieved, so as to retain the full threads at the middle of each segment, but to reduce substantially the threads at the edges of each segment corresponding to each notch 39, with the depth of the threads decreasing from the middle to each edge of a segment. The thread relief may be produced, after production of full threads, in a number of ways, such as described below. The groove 35 of FIGS. 9 and 10 for the resilient ring 25 may be produced prior to cutting the ring of FIG. 8 apart, while a pin 63 may be mounted in groove 35, at the middle of one of the segments, as in FIGS. 10 and 16, to maintain the ring in position to extend across the edge faces 64 of the segments, as in FIGS. 9 and 10, but to prevent either edge of the ring 25, which is split for more convenient installation, from moving past the pin 63, to prevent the ends of the ring from coinciding with or approaching one pair of opposed edge faces 64. In addition, a socket 65 for the pad 36 of FIG. 3 may be produced at the middle of each segment.

One way of relieving the threads is to machine one half of the threads, on the inside of ring 55, about a radius 66 offset toward the opposite half of the ring, as in FIG. 8, by a distance equal to the amount to be removed at the edges of the segment to be produced, as at reduced threads 61. The opposite half of the full threads may then be machined about a similarly offset radius 67. Alternatively, the thread relief may be formed after the full threads have been formed and the ring of FIG. 8 has been cut apart along lines 59, by placing a block between the edge faces 64 of the segments then produced, and machining about a radius extending from a center 68 of the ring. In this way, the full threads will be left at the middle of each segment, but will be progressively relieved toward each end of each segment, since the edges of the segments will be closer to the center 68 than the inner edges of the threads at the middle of the segments, by a distance corresponding to one-half the thickness of the block inserted between the ends.

Illustrated in FIGS. 15-18 is the action of the pads 36 and the thread relief in spreading the segments apart, when the connector is thrust onto the pipe or vice versa and the engagement of pipe 10 with the segments S pushes the segments toward or the cone 24. As in FIG. 15, at the middle of each segment, the pad 36 engages the cone 24 to spread the segments apart at the middles, permitting the teeth 16 of the pipe 10 to pass inwardly within the teeth 60 of each segment. A smooth surface 70, forwardly of teeth 16, assists the full teeth 60 of the segments in riding onto the teeth 16 of the pipe. In the position shown in FIG. 15 and enlarged in FIG. 17, the full teeth 60 are in opposed position to the teeth 16 during a notching operation, but will continue to spring inwardly and outwardly, as successive teeth 16 are passed, with pad 36 in engagement with the cone 21 continuing to maintain the middle of each segment spread apart a distance from the middle of the opposite segment sufficient to accommodate the relative movement between the teeth 16 and 60, as is evident from the spread between edge faces 64, exaggerated for clarity in FIG. 15. At the same time, at the edge faces 64, as in FIGS. 16 and 18, through engagement of the teeth 16 of pipe 10 with the substantially reduced threads 61, the segments will tend to be pushed against the cone 24, since there are no pads at that positon and the fixed relation between the edge faces of the same segment will prevent lateral spreading at that position. This will produce a wedged position of the separated segment ends against cone 24, but the edge of each segment at the middle will have moved toward the lip 49 at the base of cone 24 the same distance as the edge faces 64, as will be evident from FIGS. 17 and 18. Thus, the segments are retained in both lateral and axial alignment. When the inner end of the pipe 10 abuts against the seal ring 23, having moved toward the seal ring from the position of FIGS. 17 and 18, further axial movement will be prevented, and the resiliancy of the spring ring 25 will pull the segments together, with the threads on the inside of the segments in engagement with the threads 16. Thereupon, the housing H may be rotated, as on the order of one and one-half to two turns, to pull the segements in the opposite direction and seat against the bevel seat 22 of the housing, as in FIGS. 2 and 3.

Without the pads 36, or other configuration providing means for maintaining lateral and axial alignment of the segments as described later, the bevel 21 at the middle of each segment will move further onto cone 24 than is shown in FIG. 17, as the segments spread apart, but the fixed distance between the ends of the same segment limits the distance which the ends may move onto the cone, i.e. the amount illustrated in FIG. 1. 18. the edges of the segments will be behind, as it were, the middle of the segments in moving onto the cone, with the result that each segment will be tipped at an angle to a perpendicular to the axis of the pipe. The possibility of cross threading or jamming of the threads, which prevents tightening and requires first loosening the threads and then tightening, consuming valuable time, is important in fire fighting or even an industrial operation, as when a large number of spray nozzles in a chamber for treating exhaust gases are required to be changed periodically. As will be evident, the relief of the threads toward and at the ends of the segments permits the pipe threads 16 to move between the ends of the segments with a minimum of separation of the end faces 64 of opposed segments.

The connector of this invention may be installed on a pipe having damaged threads, due to the spreading of the segments and engagement with undamaged threads, such as beyond the damaged threads, or at least partial engagement with damaged threads sufficient to hold for most normal requirements. Further, if not sufficiently tightened to prevent some leakage, the connector does not pop off a pipe, as on a fire hydrant, as may prior types of toggle clamps.

A modified segment S' is illustrated in FIGS. 19 and 20. Such segments have an outer wall 56, a cone portion 20 at one end and a concave bevel 21 at the opposite end, with reduced threads 61 at each end face 64 extending to full threads (not shown) at the middle of each segment. The variation in the construction comprises slots 71 at the end faces which extend into cone 20 from one side only of a ring groove 72, which, in this embodiment, occupies a generally central position of the outer wall 56. The advantage of this type of segment lies particularly in the position of the slots 71. Thus, in the case of segments S of, either as shown in FIG. 2 or as modified in FIGS. 10-14 each when installed as illustrated in FIG. 2 and encircled by the spring ring 25, these segments may be slipped in to the recess within wall 26 of the housing with one side under the extending stem 38 of a spanner lug 15, but the opposite side of the segments cannot be placed in the desired position without first removing the screw 41 or the opposite lug 15, and then reinserting the screw or opposite lug, after the segments have been placed in position. This is due to the ring 25 being between the portion of slot 39 or 39' engaged by the pin 38 and the cone portions 30, as well as the termination of slot 39 of FIG. 2 between bevel 21 and ring 25. In the case of segments S' of FIGS. 19 and 20, it will be noted that the spring ring 25 is between the slots 71 and the bevel 21, while the slots 71 are adjacent the cone portion 20. As a result, the pins corresponding to pins 38 of FIG. 2 may be positioned to engage slots 71 between cone portions 20 and ring 25 in ring slot 72. Thus, segments S' may be placed directly in position within the housing prior to installation of the cone ring R, without the removal of slot engaging pins, since both sets of slots 71 may engage anti-rotation pins or the like without interference by spring ring 25.

In FIG. 21 is illustrated an alternative housing H', which is adapted to utilize the segments S' and which is particularly adapted to be formed by casting to produce cast spanner lugs 15', preferably two in number. Housing H' is substantially identical to the housing H described previously, except for a narrower slot 34' for a split ring corresponding to split ring 33 of FIGS. 2 and 3, thereby having bevel seat 22, walls 26 and 44, shoulder 31 and inner rim 45 of flange 27. However, instead of removable pins, fixed pins 73 may be installed, as by a press fit, within an appropriate hole provided for that purpose, as shown, such hole extending radially through the opposed cast spanner lugs 15'. As will be evident, the segments S', encircled by the spring ring 25, may be placed directly in position within the housing H' merely by slipping the assembled segments into the recess within wall 26 of the housing, with the slots 71 in alignment with the opposed pins 73 being moved to the position of FIG. 21, in which the cone portion 20 abut the bevel seat 22. The corresponding cone ring R may be installed within the housing and a locking ring corresponding to locking ring 33 then installed. When the connector, which includes the housing H' and the segments S' of FIG. 21, is moved against a pipe or vice versa, the segments S' are adapted to be shifted to the dotted position indicated, for abutment against the cone 24 of the corresponding cone ring. As before, the segments S' may each be provided with a pad at the middle, corresponding to pad 36 of FIGS. 3 and 15.

An alternative cone ring R' of FIG. 22 is also particularly adapted to be formed by casting, being similar to the cone ring R, except for a cast spanner lug 17' which extends outwardly from the axial flange 51' on which threads 18 and surface 53 are provided. As before, cone 24 is formed on the front face of a lateral flange 28, with a lip 32 outwardly from cone 24 and a cylindrical rim 49 of a desired size around the flange. A recess similar to recess 29 of FIG. 7, i.e. with an undercut, may be provided in the cone ring R', although it is shown with a cylindrical recess 29', for use with a cylindrical seal ring which provides sufficient frictional resistance with the wall of recess 29' to stay in place. As before, the seal ring will abut against a shoulder 50.

A further alternative housing H", also particularly adapted to be formed by casting followed by appropriate machining, is illustrated in FIGS. 23 and 24, with a variation thereof illustrated in FIG. 25. As in the case of housing H', cast spanner lugs 15' are shown as two in number and extend axially of the outer periphery of the housing, but have grooves 75 in the sides thereof for readier engagement with the spanner wrench. In addition, a socket 76 is drilled from the inside into each of the spanner lugs 15', to receive a pin corresponding to pin 73 of FIG. 21 to deter relative rotation of the segments used therewith. The sockets 76 are located as shown, in a position corresponding to the pin 73 of FIG. 21, as for use with segments S' of FIGS. 19-21. Since the drilling of the socket 76 requires the drill to be placed within the central opening of the housing, the variation illustrated in FIG. 25 permits a socket 76' to be drilled by a drill disposed angularly to the recess wall 26, so that the drill bit may extend into the interior of the housing, but from the outside. A pin 73' may be installed within the socket 76' at approximately the same position as the pin 73 of FIG. 21, but because of its angularity, provided with a bevel 77 and a notch 78, to correspond to the contour of the slots 71 of the segments S' of FIGS. 19–21, when used therewith.

An alternative housing H''' of FIG. 26 is also adapted to be formed by casting and is provided with dual spanner lugs 15'' which have flat sides, as shown, although the configuration of the spanner lugs 15' of FIG. 23 may be utilized. The housing H''' is provided with a bevel seat 22 and a shoulder 31, as before, but for a limited distance, extending axially from the bevel seat 22, the recess wall 26 is provided with a flat shoulder 80 of 15° to 45° circumferential extent at each side, as shown, interspaced between lugs 15'', or at any other position, as at lugs 15''. In order to form segments for use with the housing of FIG. 26, a ring 81 of FIG. 27 may be formed with opposed flats 82 but with a similar cone portion and bevel, including cone 20, as well as relieved threads on the inside. The segments may be cut apart along the lines 59' at the center of the flats 82, while these segments correspond in part to the segments S'' of FIGS. 19–21, in that each flat 82 is located between cone portion 20 and the groove for the spring ring.

An alternative housing H'''' of FIGS. 28 and 29 is again particularly adapted to be cast, being provided with cast spanner lugs 15', but otherwise similar to the housing H' of FIG. 21, except that a cast rib 83, which is integral with the housing, is positioned at the outer edge of cone 22, to engage end slots at the ends of segments S' of FIGS. 19 and 20. Rib 83 has a width and axial extension corresponding to that of the pin 73 of FIG. 21. Thus, the rib 83 cooperates with segments S' in the same manner as the pin 73 of FIG. 21, but the necessity for drilling a hole for and inserting the pin in the hole, as by a press fit, is avoided.

An alternative segment configuration may be formed from a ring 85, as illustrated in FIG. 30, and having an outer wall 56' greater in diameter than the diameter of the recess wall 26 of any of the housings previously described by an amount referred to below, as well as an inner wall 57', of an appropriate size, a bevel 21' at one end opposite cone and an. Opposed notches 86 are formed in the ring, with each having a width (not shown) greater than the notches 58 of FIG. 8 by a distance corresponding to the distance between a pair of cutting lines 87, to form a block 88 between them, which distance corresponds to the increased diameters of outer wall 56' and inner wall 57'. Block 88, which may have a width of 0.200 inch for notches 86 of 0.470 inch width and an outer diameter of 3.800 inches and inner diameter of 3.120 inches for a connector having a nominal diameter of 4.25 inches, falls out after cuts along lines 87 are made. The edges of the segments, after cuts along lines 87, are abutted to form a configuration of offset semi-circles which has a greater dimension across the abutting edges than perpendicular thereto, i.e. across the middle of the segments. It will be understood that the outer edges 56' of each segment may not be a complete semicircle, i.e. extend for 180° for arc, due to the gaps at notches 86 and the removal of blanks 88. Thus, the term "offset semicircles" as used herein to describe such segments, includes not only complete semicircles but also substantially or nearly complete semicircles. Then the threads may be machined in the inner wall 57' of the abutting segments. As will be evident, the threads may be out to full depth at the center of each segment and correspondingly reduced in depth at each edge of each segment, since the circular path described by the thread cutting tool will cut considerably deeper into the inside wall at the center of each segment than at the edges of the segments. Thus, full threads may be formed at the center of each segment with the depth of the threads progressively decreasing toward each edge of the segment.

The further alternative configuration of segments S'' illustrated in FIG. 31 may be formed by machining a ring prior to the separation into segments S'' by cutting at the edge faces 64', thereby forming slots 71' from slots corresponding in width to slots 58 of FIG. 8, or these and additional configurations may be produced directly by die casting techniques. Each segment has an outer edge 90 formed by an offset semicircle inner edge 91, formed by an offset center radii 92 and 93, respectively, for one of the segments, i.e. one half of the ring, and corresponding radii offset in the opposite direction, for the other segment. The term "offset semicircles" is to be interpreted as referred to previously. When the threads are cut from the ring center 94, prior to cutting apart, the thread depth indicated by the dash line 95 will be deepest at the center of each segment and shallowest at the edge faces 64'. A groove, whose inner edge is represented by the circular dotted line 96, is adapted to receive the spring ring, the position of which is indicated by the dash line 25. The groove 96 preferably has a radius from the center 94, so that the circular shape of the ring 25' will not be disturbed. As will be evident, the ring groove 96 will be deeper at the edge faces 64' than at the center of each segment at which the ring groove will have approximately the same depth as the ring groove of other segments described hereinbefore. Bevels 21'' of segments S'' are preferably machined with the segments spread apart, as by blocks between opposed edge faces 64', so that the radius of the bevel will correspond to the radius of the area of cone 24 of ring R when the segments are spread apart, as in FIGS. 15–18. However, the cone opposite bevel 21'' is preferably machined prior to cutting apart the ring from which the segments S'' are formed, so that the radius of the cone portions will correspond to the radius of the portion of bevel 22 of housing H engaged by the cone portions 20 when the segments are in a tightened position, as in FIGS. 2 and 3. A portion 97 of a housing is also indicated in FIG. 31, with the segments S'' centered within the recess wall 26, and the outer edge and spanner lugs 15' also being shown. As will be evident, the segments at the edge face slots 71' closely approach the wall 26, but at the center of each segment, the outer edge 90 is spaced a comparatively greater distance from the housing wall 26. Thus, when the connector is thrust onto a pipe or the like, or a pipe or the like is thrust into the connector, the segments will be spread apart, but the center of each segment can move laterally a considerably greater distance than the edges. Thus, a bevel 21'' may move axially along the cone 24 of the ring R of FIG. 2 a distance corresponding to the amount of movement of the edges of the segments, whose greater distance apart would normally permit them to move further onto the cone except for the spreading of the segments apart, as in FIG. 15. Thus, the necessity for using the pads 36, as in FIG. 15, is avoided.

Although a preferred embodiment of this invention has been described and numerous variations shown described, it will be understood that other embodiments may exist and that various additional changes may be made, all without departing from the spirit and scope of this invention.

What is claimed is:

1. A fluid conduit connector for attachment to a hollow, cylindrical threaded member, comprising:
   a hollow, cylindrical housing having an inwardly extending, concave, frusto-conical seat;
   a hollow, cylindrical ring having at one end an outwardly extending, convex, frustoconical cone which fits within said housing in spaced relation to said seat, one of said ring and said threaded member having a seal ring abutted by the other when said member extends within said housing;
   means for attaching said ring within said housing in an axially fixed position but permitting relative rotation therebetween;
   a pair of generally semicircular, interiorly threaded segments, having a concave, frusto-conical bevel at one end and a convex, frusto-conical cone portion at the opposite end, said cone portions engaging said housing seat for tightening said segments on said threaded member and said bevels approaching or engaging said ring cone for spreading said segments apart on relative axial movement between said member and said housing and engagement between said member and said segments;
   resilient means urging said segments toward an abutting relation of the opposed edges;
   means for restraining relative rotation between said segments and said housing; and
   means provided by a configuration of said segments for maintaining lateral and axial alignment of said segments as said segment bevels approach or engage said ring cone on relativve axial movement between said member and said housing.

2. A connector as defined in claim 1, wherein:
   said interior threads of said segments are full threads at the middle of each segment and have a substantially lesser depth at the opposes edges of said segments.

3. A connector as defined in claim 2, wherein:
   said interior threads of said segments progressively decrease in depth from the middle of each segment to each edge of the corresponding segment.

4. A connector as defined in claim 2, wherein:
   said frusto-conical surfaces of said housing, said cone ring and said segments extend at a corresponding angle for each of approximately 45° to the axis of said connector.

5. A connector as defined in claim 2, wherein:
   said configuration of said segments providing said means for maintaining lateral and axial alignment of said segments includes a pad adjacent the middle of each segment and extending from said bevel toward said ring cone.

6. A connector as defined in claim 5, wherein:
   said segments are formed of metal and said pads are formed of plastic.

7. A connector as defined in claim 2, wherein:
   said configuration of said segments providing said means for maintaining lateral and axial alignment of said segments includes offset semicircles of the outside of said segments and such that when the opposed edges are in abutting relation, the dimension across the opposed edges of said segments will be greater than the dimension across the middle of said segments.

8. A connector as defined in claim 1 wherein:
   said means for restraining relative rotation between said segments and said housing engages said segments adjacent the opposed edges of said segments 9. A connector as defined in claim 8, including:
   axial notches in the outsides of the opposed edges of said segments; and
   means extending inwardly into said notches from said housing to restrain relative rotation between said segments and said housing.

10. A connector as defined in claim 9, wherein:
    said inwardly extending means restrain lateral play of the opposed edges of said segments.

11. A connector as defined in claim 9, wherein:
    said inwardly extending means extends from at least a portion of said seat.

12. A connector as defined in claim 9, wherein:
    said inwardly extending means comprises pins at opposite sides of said housing.

13. A connector as defined in claim 12, wherein:
    said housing is provided on the outside with a series of spanner lugs; and
    at least one spanner lug is provided with a pin extending inwardly within said housing.

14. A connector as defined in claim 9, wherein:
    said inwardly extending means includes a axial rib integral with said housing on opposite sides thereof.

15. A connector as defined in claim 9, including:
    a groove extending ccircumferentially around the outside of said segments; and
    a circular, resilient ring disposed within said groove.

16. A connector as defined in claim 15, wherein:
    said groove is disposed adjacent said cone portion; and
    said notches extend at least between said groove and the end edge of the corresponding segment opposite said cone portion.

17. A connector as defined in claim 15, wherein:
    said groove is spaced from said cone portion; and
    said notches extend between said cone portion and said groove and into said cone portion.

18. A connector as defined in claim 1, wherein:
    said frusto-conical surfaces of said housing, said cone ring and said segments extend at a corresponding angle for each of approximately 45° to the axis of said connector;
    said interior threads of said segments are full threads at the middle of each segment and progressively decrease in depth from the center of each segment to each edge of the corresponding segment;
    said configuration of said segments providing said meand for maintaining lateral and axial alignment of said segments includes a pad adjacent the middle of each segment and extending from said bevel toward said ring cone;
    said segments have axial notches in the outsides of the opposed edges;
    means extend inwardly into said notches from said housing to restrain relative rotation between said segments and said housing, said inwardly extending means restraining lateral play of the opposed edges of said segments;
    a groove extends circumferentially around the outside of said segments in abutting relation; and
    a circular, resilient ring is disposed within said groove.

19. A connector as defined in claim 1, wherein said means for restraining relative rotation between said segments and said housing includes:

an inwardly extending, shoulder of limited circumferential extent at each of opposite sides of the inside of said housing; and a mating axial surface, adjacent each end of each segment, engageable with one of said shoulders of said housing, whereby adjacent surfaces of both segments engage the same shoulder of said housing.

20. A connector as defined in claim 19, wherein:
each said shoulder of said housing and each surface of each said segment is flat.

* * * * *

UNITED STATES PATENT AND TRADEMARK OFFICE
CERTIFICATE OF CORRECTION

PATENT NO. : 4,172,606
DATED : October 30, 1979
INVENTOR(S) : Wilson S. Howe

It is certified that error appears in the above-identified patent and that said Letters Patent are hereby corrected as shown below:

Column 3, line 42, "housihg" should read --housing--. Column 4, line 8, before "split", --a-- should be inserted. Column 5, line 51, "Ar" should read --Or--. Column 7, line 3, "seal" should read --seat--; line 5, "slots" should read --slot--; line 10, "110" should read --10--; line 39, a parenthesis [)] should be inserted after "10"; line 42, "39" should read --39'--. Column 8, line 31, after "or", --against-- should be inserted. Column 9, line 11, "Fig. 1.18" should read --Fig. 18--; line 11, --Thus,-- should be inserted after --18--; line 47, after "S", "of" should be cancelled; line 50,"in to" should read --into--; line 63, "portion" should read --portions--. Column 10, line 21, "portion" should read --portions--. Column 11, line 16, "portion" should be cancelled; line 16, after "cone", --portions-- should be inserted; line 40, before "opposite", --and an-- should be inserted; line 40, after "cone", "and an" should read --(not shown); lines 41 and 42, "(not shown)" should be cancelled; line 58, before "arc", "for" should read --of--. Column 12, line 13, after "offset", --semicircles, as by using offset-- should be inserted. Column 13, line 31 (claim 1), "relativve" should read --relative--. Column 15, line 1 (claim 19), --axial-- should be inserted before "shoulder".

Signed and Sealed this

Twenty-ninth Day of January 1980

[SEAL]

Attest:

SIDNEY A. DIAMOND

Attesting Officer

Commissioner of Patents and Trademarks